(12) United States Patent
Yadav et al.

(10) Patent No.: US 12,044,147 B1
(45) Date of Patent: Jul. 23, 2024

(54) SEGMENTED LEADING EDGE GUARDS

(71) Applicant: General Electric Company, Schenectady, NY (US)

(72) Inventors: Abhijeet Jayshingrao Yadav, Bengaluru (IN); Nitesh Jain, Bengaluru (IN); Nicholas J. Kray, West Chester, OH (US); Nuthi Srinivas, Bengaluru (IN)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 18/176,241

(22) Filed: Feb. 28, 2023

(30) Foreign Application Priority Data

Jan. 31, 2023 (IN) .............................. 202311006249

(51) Int. Cl.
*F01D 5/28* (2006.01)
(52) U.S. Cl.
CPC .......... *F01D 5/288* (2013.01); *F05D 2220/32* (2013.01); *F05D 2240/303* (2013.01); *F05D 2300/611* (2013.01)
(58) Field of Classification Search
CPC ............................ F01D 5/288; F05D 2240/303
See application file for complete search history.

(56) References Cited

U.S. PATENT DOCUMENTS

| | | | |
|---|---|---|---|
| 1,339,886 A | 5/1920 | Heath | |
| 1,404,849 A | 1/1922 | Hamilton | |
| 8,435,003 B2 | 5/2013 | Read et al. | |
| 8,734,114 B2 * | 5/2014 | McMillan | F04D 29/324 416/232 |
| 9,689,269 B2 | 6/2017 | Bottome | |
| 10,677,259 B2 | 6/2020 | Jain et al. | |
| 10,788,053 B2 * | 9/2020 | Kumar | F04D 29/684 |
| 2010/0028160 A1 | 2/2010 | Schaeffer et al. | |
| 2016/0010468 A1 | 1/2016 | Kray et al. | |

FOREIGN PATENT DOCUMENTS

| | | | |
|---|---|---|---|
| JP | 61164002 A | | 7/1986 |
| JP | S61164002 A | * | 7/1986 |

* cited by examiner

*Primary Examiner* — Justin D Seabe
*Assistant Examiner* — John S Hunter, Jr.
(74) *Attorney, Agent, or Firm* — Hanley, Flight & Zimmerman, LLC

(57) ABSTRACT

Examples disclosed herein include a fan blade of a gas turbine engine. The disclosed fan blade includes a main body having a leading edge and a trailing edge. The fan blade includes a leading edge guard covering the leading edge and a leading section of the main body adjacent to the leading edge. The leading edge guard includes a plurality of leading edge guard segments consecutively arranged in a spanwise direction along the leading edge of the fan blade. Each of the plurality of leading edge guard segments are oriented at an angle relative to a root of the fan blade. Each of the plurality of leading edge guard segments includes a nose portion coupled to the leading edge and a wing portion coupled to opposing sides of the leading section of the main body.

20 Claims, 9 Drawing Sheets

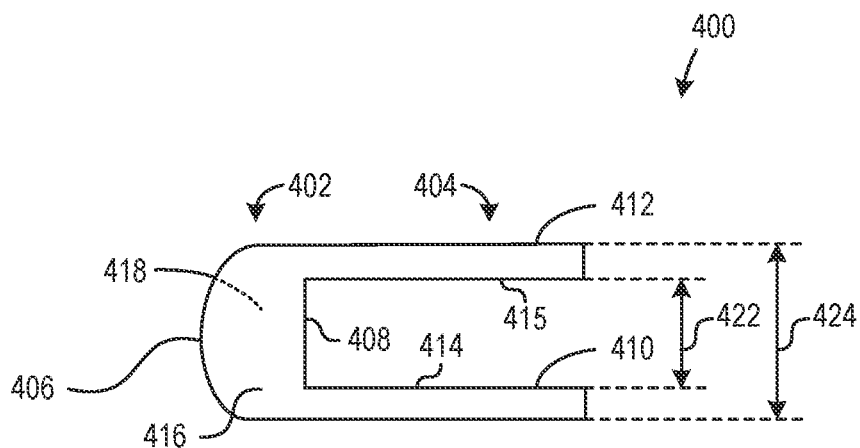
FIG. 4A
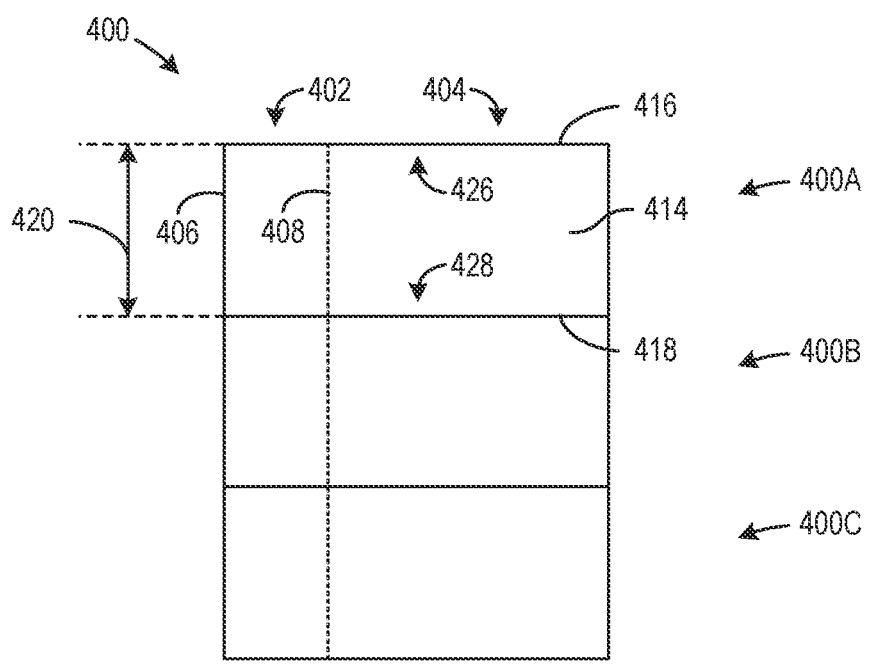
FIG. 4B
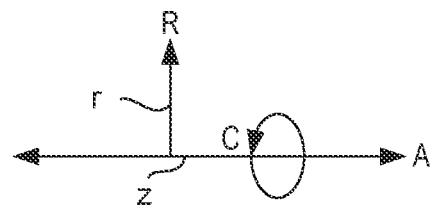

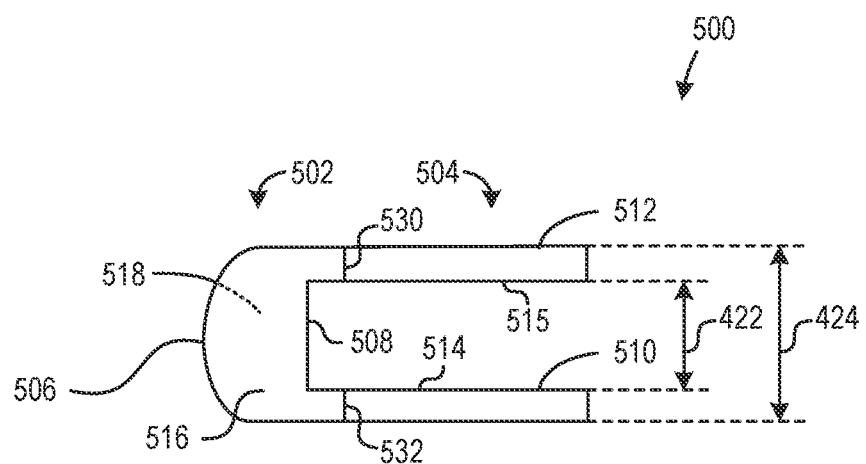
FIG. 5A
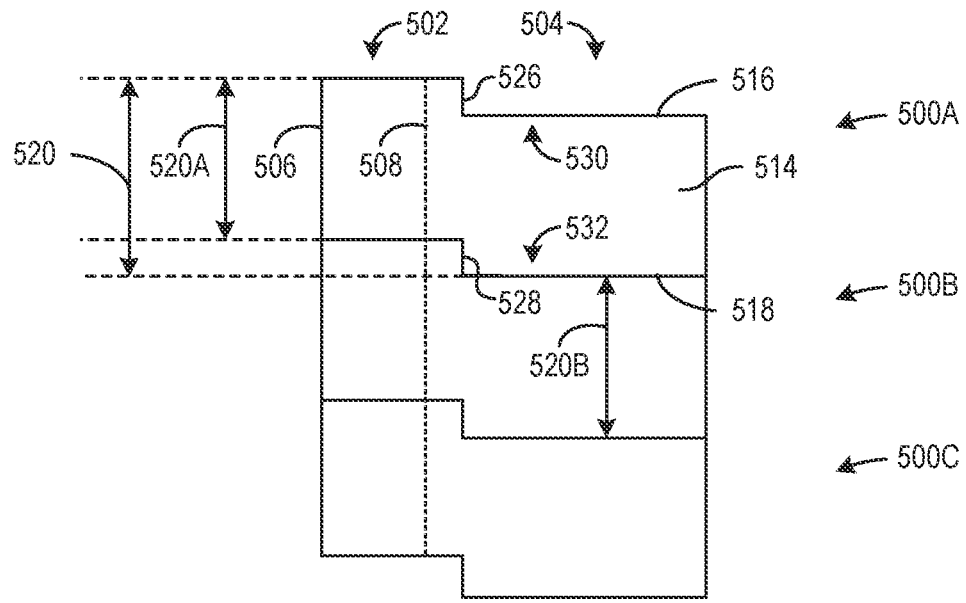
FIG. 5B
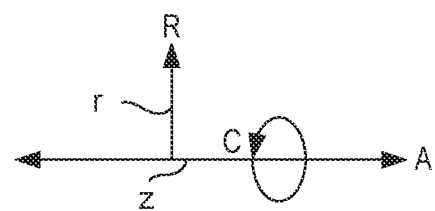

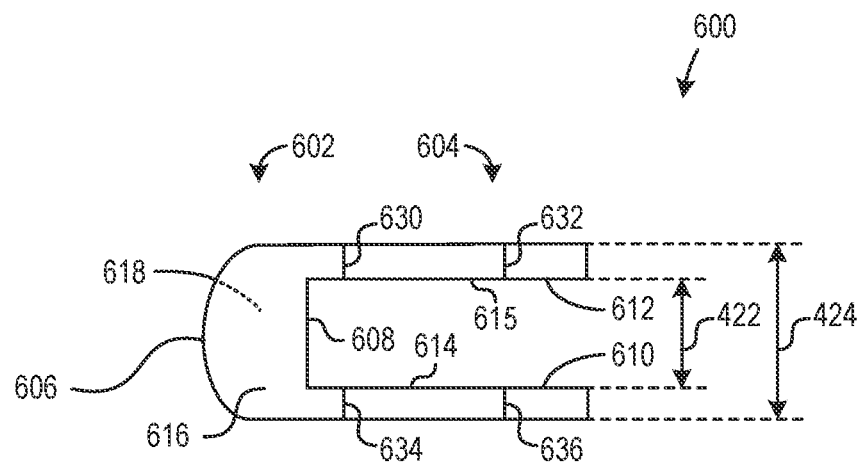
FIG. 6A
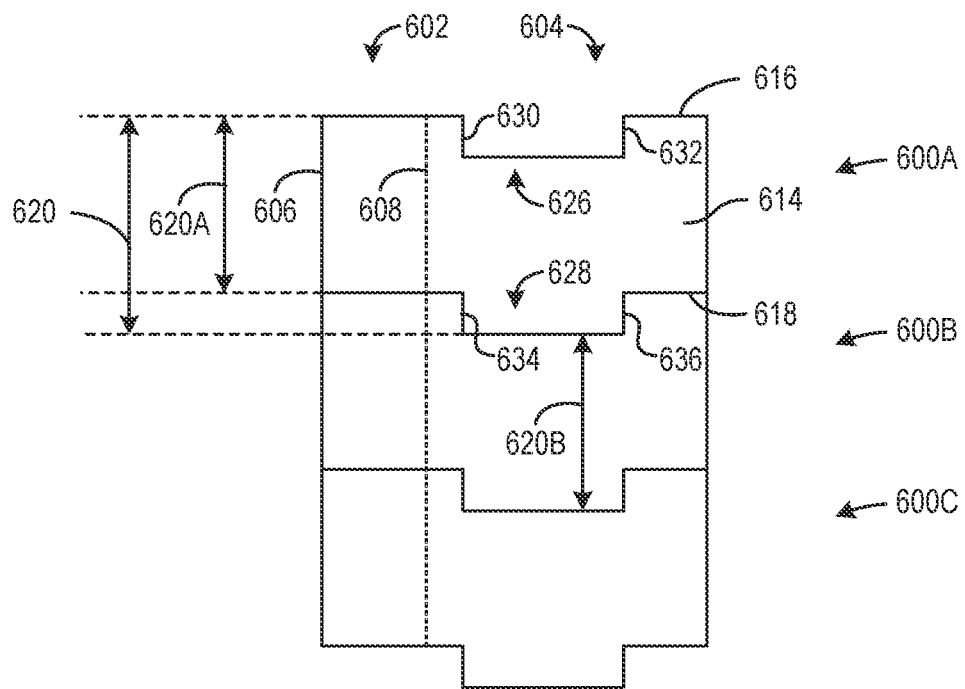
FIG. 6B
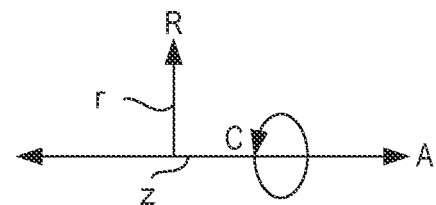

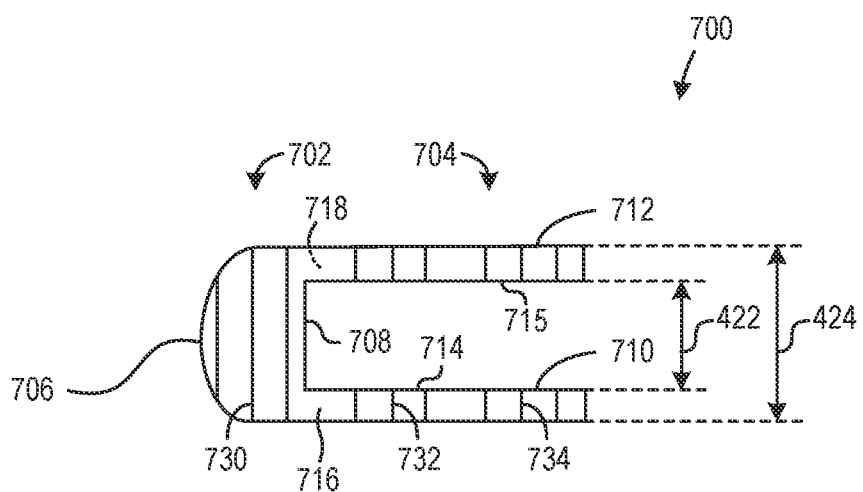
FIG. 7A
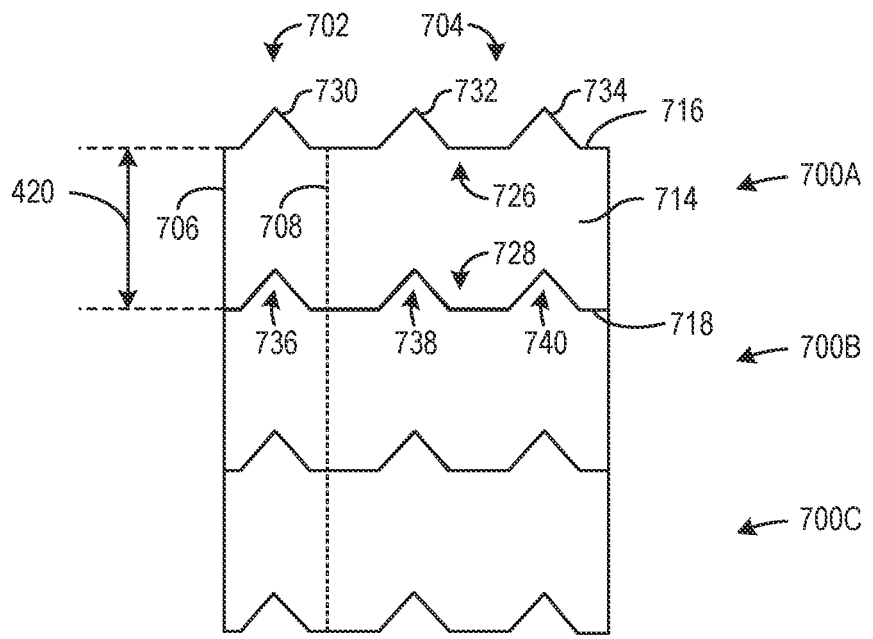
FIG. 7B
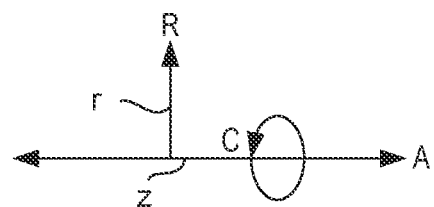

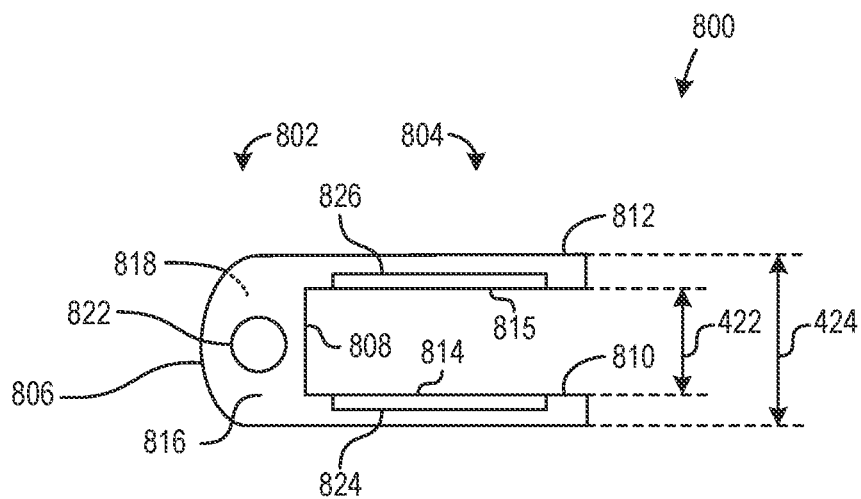
FIG. 8A
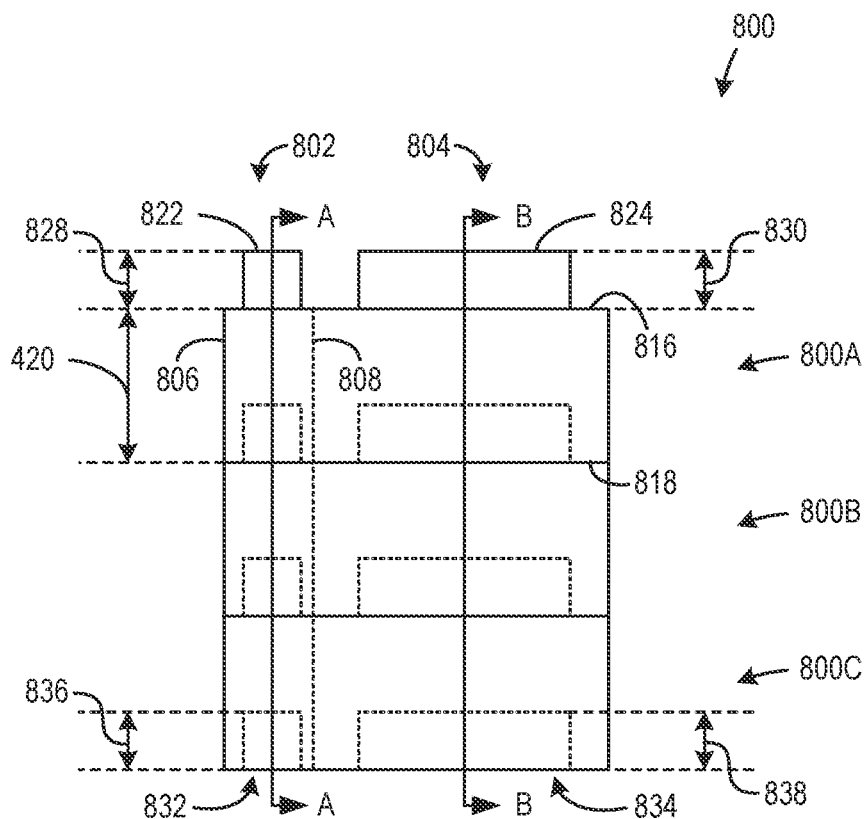
FIG. 8B
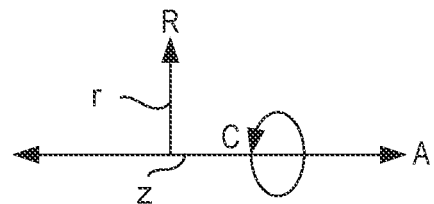

SEGMENTED LEADING EDGE GUARDS

RELATED APPLICATION

This patent claims the benefit of Indian Provisional Patent Application No. 202311006249, which was filed on Jan. 31, 2023. Indian Provisional Patent Application No. 202311006249 is hereby incorporated herein by reference in its entirety. Priority to Indian Provisional Patent Application No. 202311006249 is hereby claimed.

FIELD OF THE DISCLOSURE

This disclosure relates generally to turbofan engines, and, more particularly, to fan blades in turbofan engines.

BACKGROUND

Turbofan engines on aircraft include a fan section upstream of a gas turbine engine (or turbomachine). The fan section and the gas turbine engine are both disposed within an annular nacelle (or casing) of the turbofan engine. The fan section is composed of a plurality of fan blades mounted on a fan spool. The fan blades extend radially outward from the fan spool and have a swept curve shape and a contoured leading edge. The fan section is powered by the turbine of the gas turbine engine, which rotates the fan spool. As the fan section rotates, a pressure differential between pressure surfaces and suction surfaces of the fan blades is created, thus causing air to be sucked into the engine. When a volume of air enters an inlet section, the fan section diverts a first portion of the air into a bypass airflow passage and a second portion of the air into the gas turbine engine.

BRIEF DESCRIPTION OF THE DRAWINGS

FIG. 4A is a top view of a first example leading edge guard segment in accordance with teachings disclosed herein.

FIG. 4B is a side view of a non-overlapping arrangement of the first example leading edge guard segments of FIG. 4A.

FIG. 5A is a top view of a second example leading edge guard segment in accordance with teachings disclosed herein.

FIG. 5B is a side view of a non-overlapping arrangement of the second example leading edge guard segments of FIG. 5A.

FIG. 6A is a top view of a third example leading edge guard segment in accordance with teachings disclosed herein.

FIG. 6B is a side view of a non-overlapping arrangement of the third example leading edge guard segments of FIG. 6A.

FIG. 7A is a top view of a fourth example leading edge guard segment in accordance with teachings disclosed herein.

FIG. 7B is a side view of a non-overlapping arrangement of the fourth example leading edge guard segments of FIG. 7A.

FIG. 8A is a top view of a fifth example leading edge guard segment in accordance with teachings disclosed herein.

FIG. 8B is a side view of an overlapping arrangement of the fifth example leading edge guard segments of FIG. 8A.

The figures are not to scale. In general, identical reference numbers used throughout the drawing(s) indicate the same elements, and accompanying written descriptions refer to the same or like parts.

DETAILED DESCRIPTION

Figure 1:
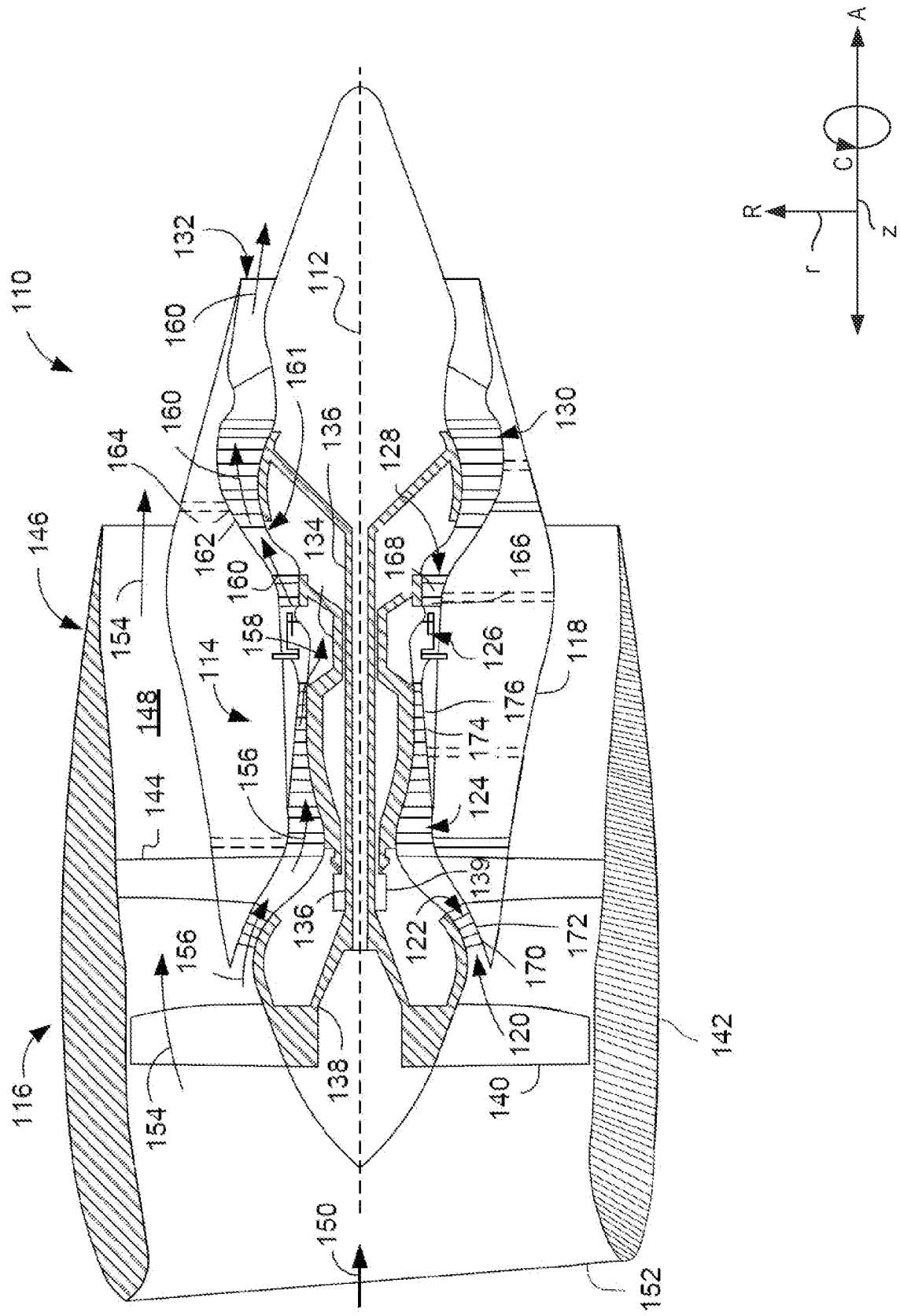
FIG. 1 is a cross-sectional view of an example high-bypass turbofan-type gas turbine engine in which examples disclosed herein can be implemented.

Example segmented leading edge guards are disclosed herein. Disclosed segmented leading edge guards can be used for fan blades of turbofan engines to improve the strength and durability of the fan blades. Segmented leading edge guards disclosed herein can reduce manufacturing and repair cost and complexity associated with leading edge guards. Furthermore, disclosed segmented leading edge guards reduce imbalance that can occur when one or more of the leading edge guard segments detaches from the fan blade, which reduces radial vibrations and improves performance of the turbofan engine. Disclosed segmented leading edge guards also reduce damages associated with a fan blade out event, in which the fan blade dislodges from the fan spool and strikes the nacelle of the engine.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

As used herein, the terms "upstream" and "downstream" refer to the location along a fluid flow path relative to the direction of fluid flow. For example, with respect to a fluid flow, "upstream" refers to a location from which the fluid flows, and "downstream" refers to a location toward which the fluid flows. For example, with regard to a flame arrester, a protected side is said to be upstream of an unprotected side, and a gas is said to flow from the protected side to the unprotected side.

As used herein, in the context of describing the position and/or orientation of a first object relative to a second object, the terms "orthogonal," "transverse," "perpendicular," and "parallel" encompasses such terms and more broadly encompasses a meaning whereby the first object is positioned and/or oriented relative to the second object at an absolute angle of no more than five degrees (5°) from orthogonal (e.g., 90° or 270°) and/or parallel (e.g., 0° or 180°). For example, a first axis that is orthogonal to a second axis is positioned and/or oriented relative to the second axis at an absolute angle of no more than five degrees (5°) from orthogonal, such as at an angle within a range of angles between 85° and 95°.

As used herein, "radially" is used to express a point or points along a radial vector originating at a central axis of a rotating body and pointing perpendicularly outward from the central axis. For example, a fan blade is said to have a length extending radially outward from a fan spool, meaning that the length is orthogonal to a central axis of the fan spool.

As used herein, "spanwise" is used to mean a direction parallel to the span of a fan blade. The spanwise direction can lead radially outward from the root toward the tip or radially inward from the tip to the root. For example, a leading edge guard of the fan blade is said to extend spanwise along the leading edge from the root toward the tip. As used herein, "chordwise" is used to mean a direction parallel to the chord of a fan blade. The chordwise direction can lead axially aft from the leading edge to the trailing edge or axially forward from the trailing edge to the leading edge. For example, a leading edge guard of the fan blade is said to extend chordwise along opposing surfaces of the fan blade from the leading edge toward the trailing edge.

During operation of the aircraft, foreign object debris (FOD) hazards (e.g., bird strikes, hail, ice, sandstorms, ash-clouds, objects on the runway, etc.) can impact the fan section and damage the leading edge(s) of one or more fan blades. Such damage can negatively affect the performance of the impacted fan blade(s) and the turbofan engine. However, if the FOD impact is substantial, the fan blade can break apart and/or dislodge from a fan spool or shaft, fly radially outward, and hit the nacelle or the aircraft. Fan blades can include leading edge guards (e.g., metal leading edge guards, etc.) to improve the strength of the leading edge and to protect against erosion or catastrophic damage imposed by FOD hazards. Typically, leading edge guards are constructed of high-strength metal and include a reinforced portion (also referred to as a nose) and an interfacing portion (also referred to as wings). The nose protrudes laterally outward from the leading edge, and the wings wrap around or cover areas of the opposing surfaces adjacent to the leading edge.

Some conventional leading edge guards are composed of a single part that corresponds to a contoured profile of the leading edge and the twisting shape of the fan blade. Although such three-dimensional designs provide sufficient and continuous strength along the leading edge, fabrication of such shapes into one homogenous part is often complex, expensive, and inefficient. Furthermore, the homogenous design does not provide opportunities for optimizing weight, strength, or other material properties about the length of the leading edge guard without sacrificing performance. That is to say, if a higher strength was desired toward the root of the fan blade, the nose of the leading edge guard would need to be thicker in some direction(s), which would increase weight and potentially reduce the pressure differential generated.

Typically, fan blades are formed of composite materials and the leading edge guards are formed of metal containing materials, and, as such, the two are bonded together via adhesives (e.g., epoxy, polyurethane, etc.). In the event of an FOD strike, the leading edge guard can decouple (e.g., unbind or detach) from the fan blade based on the size of the FOD and the location of the strike. When the leading edge guard is composed of a single metal part, the maintenance required to repair decoupling is a time extensive and costly process. In some cases, when separation occurs at a portion of the leading edge guard, the entire part is removed and replaced.

After substantial FOD strikes, the fan blade may dislodge and become detached from the fan spool. As used herein, the term "fan blade out" or "fan blade out event" refers to an incident in which a fan blade disconnects from the fan spool, and impacts the nacelle of the engine, another fan blade, and/or the aircraft. When a fan blade with a homogenous leading edge guard impacts another object (e.g., nacelle, fan blade, etc.) the mass of the entire leading edge guard contributes to the impact force. Thus, such conventional leading edge guards can cause significant damage during a fan blade out (FBO) event.

Example segmented leading edge guards are disclosed herein. Such example leading edge guards include a plurality of leading edge guard segments consecutively arranged or positioned in sequence along the fan blade in the spanwise direction. The individual leading edge segments can be produced separately to reduce cost and improve efficiency of manufacturing. When dis-bonding occurs due to FOD impact(s), the repair time is significantly reduced because only a portion of the leading edge guard segments need to be replaced. Furthermore, if an FBO event occurs, example segmented leading edge guards disclosed herein can break apart on impact. Thus, only a portion of the leading edge guard mass provides the impact force, and the damage inflicted during FBO events is significantly reduced.

Example segmented leading edge guards disclosed herein can include segments made of different materials (e.g., titanium, stainless steel, etc.) to reduce overall weight of the fan blade and increase the strength of the leading edge at certain areas. It should be appreciated that, after a nondestructive FBO, the aircraft continues flying and the engines need to produce as much thrust as possible despite the reduced number of fan blades. However, since fan blade(s) are missing from one side of the fan spool, the fan section becomes imbalanced and causes radial vibrations and/or oscillations. This can lead to further damage of the engine and/or a reduction in engine performance. Thus, the reduced weight of examples disclosed herein improves safety as well as performance in the event of an FBO event.

Referring now to the drawings, FIG. 1 is a cross-sectional view of an example high-bypass turbofan-type gas turbine engine 110 ("turbofan engine 110"). While the illustrated example is a high-bypass turbofan engine, the principles of the present disclosure are also applicable to other types of engines, such as low-bypass turbofans, turbojets, turboprops, etc. As shown in FIG. 1, the turbofan engine 110 defines a longitudinal or axial centerline axis 112 extending therethrough for reference, which corresponds to the axis of rotation z. FIG. 1 also includes an annotated directional diagram with reference to the axis of rotation z and an axial direction A, the radial axis r and a radial direction R, and a circumferential direction C. In general, as used herein, the axial direction A is a direction that extends generally parallel to the centerline axis 112, the radial direction R is a direction that extends orthogonally outwardly from the centerline axis 112, and the circumferential direction C is a direction that extends concentrically around the centerline axis 112.

In general, the turbofan engine 110 includes a core turbine or gas turbine engine 114 disposed downstream from a fan section 116. The core turbine 114 includes a tubular outer casing 118 that defines an annular inlet 120. The outer casing 118 can be formed from a single casing or multiple casings. The outer casing 118 encloses, in serial flow relationship, a compressor section having a booster or low pressure compressor 122 ("LP compressor 122") and a high pressure compressor 124 ("HP compressor 124"), a combustion section 126, a turbine section having a high pressure turbine 128 ("HP turbine 128") and a low pressure turbine 130 ("LP turbine 130"), and an exhaust section 132. A high pressure shaft or spool 134 ("HP shaft 134") drivingly couples the HP turbine 128 and the HP compressor 124. A low pressure shaft or spool 136 ("LP shaft 136") drivingly couples the LP turbine 130 and the LP compressor 122. The LP shaft 136 can also couple to a fan spool or shaft 138 of the fan section 116. In some examples, the LP shaft 136 is coupled directly to the fan shaft 138 (e.g., a direct-drive configuration). In alternative configurations, the LP shaft 136 can couple to the fan shaft 138 via a reduction gear 139 (e.g., an indirect-drive or geared-drive configuration).

As shown in FIG. 1, the fan section 116 includes example fan blades 140 coupled to and extending radially outwardly from the fan shaft 138. Example fan blades disclosed herein can be implemented as any one of the fan blades 140, and the fan blades 140 can all include example leading edge guards as disclosed herein. An annular fan casing or nacelle 142 circumferentially encloses the fan section 116 and/or at least a portion of the core turbine 114. The nacelle 142 can be supported relative to the core turbine 114 by a plurality of circumferentially spaced outlet guide vanes 144. Furthermore, a downstream section 146 of the nacelle 142 can enclose an outer portion of the core turbine 114 to define a bypass airflow passage 148 therebetween.

As illustrated in FIG. 1, air 150 enters an inlet portion 152 of the turbofan engine 110 during operation thereof. A first portion 154 of the air 150 flows into the bypass airflow passage 148, while a second portion 156 of the air 150 flows into the inlet 120 of the LP compressor 122. One or more sequential stages of LP compressor stator vanes 170 and LP compressor rotor blades 172 coupled to the LP shaft 136 progressively compress the second portion 156 of the air 150 flowing through the LP compressor 122 en route to the HP compressor 124. Next, one or more sequential stages of HP compressor stator vanes 174 and HP compressor rotor blades 176 coupled to the HP shaft 134 further compress the second portion 156 of the air 150 flowing through the HP compressor 124. This provides compressed air 158 to the combustion section 126 where the compressed air 158 mixes with fuel and burns to provide combustion gases 160.

The combustion gases 160 flow through the HP turbine 128 where one or more sequential stages of HP turbine stator vanes 166 and HP turbine rotor blades 168 coupled to the HP shaft 134 extract a first portion of kinetic and/or thermal energy therefrom. This energy extraction supports operation of the HP compressor 124. The combustion gases 160 then flow through the LP turbine 130 where one or more sequential stages of LP turbine stator vanes 162 and LP turbine rotor blades 164 coupled to the LP shaft 136 extract a second portion of thermal and/or kinetic energy therefrom. This energy extraction causes the LP shaft 136 to rotate, which supports operation of the LP compressor 122 and/or rotation of the fan shaft 138. The combustion gases 160 then exit the core turbine 114 through the exhaust section 132 thereof. A turbine frame 161 with a fairing assembly is located between the HP turbine 128 and the LP turbine 130. The turbine frame 161 acts as a supporting structure, connecting a high-pressure shaft's rear bearing with the turbine housing and forming an aerodynamic transition duct between the HP turbine 128 and the LP turbine 130. Fairings form a flow path between the high-pressure and low-pressure turbines and can be formed using metallic castings (e.g., nickel-based cast metallic alloys, etc.).

Along with the turbofan engine 110, the core turbine 114 serves a similar purpose and is exposed to a similar environment in land-based gas turbines, turbojet engines in which the ratio of the first portion 154 of the air 150 to the second portion 156 of the air 150 is less than that of a turbofan, and unducted fan engines in which the fan section 116 is devoid of the nacelle 142. In each of the turbofan, turbojet, and unducted engines, a speed reduction device (e.g., the reduction gear 139) can be included between any shafts and spools. For example, the reduction gear 139 is disposed between the LP shaft 136 and the fan shaft 138 of the fan section 116.

As described above with respect to FIG. 1, the turbine frame 161 is located between the HP turbine 128 and the LP turbine 130 to connect the high-pressure shaft's rear bearing with the turbine housing and form an aerodynamic transition duct between the HP turbine 128 and the LP turbine 130. As such, air flows through the turbine frame 161 between the HP turbine 128 and the LP turbine 130.

Figure 2:
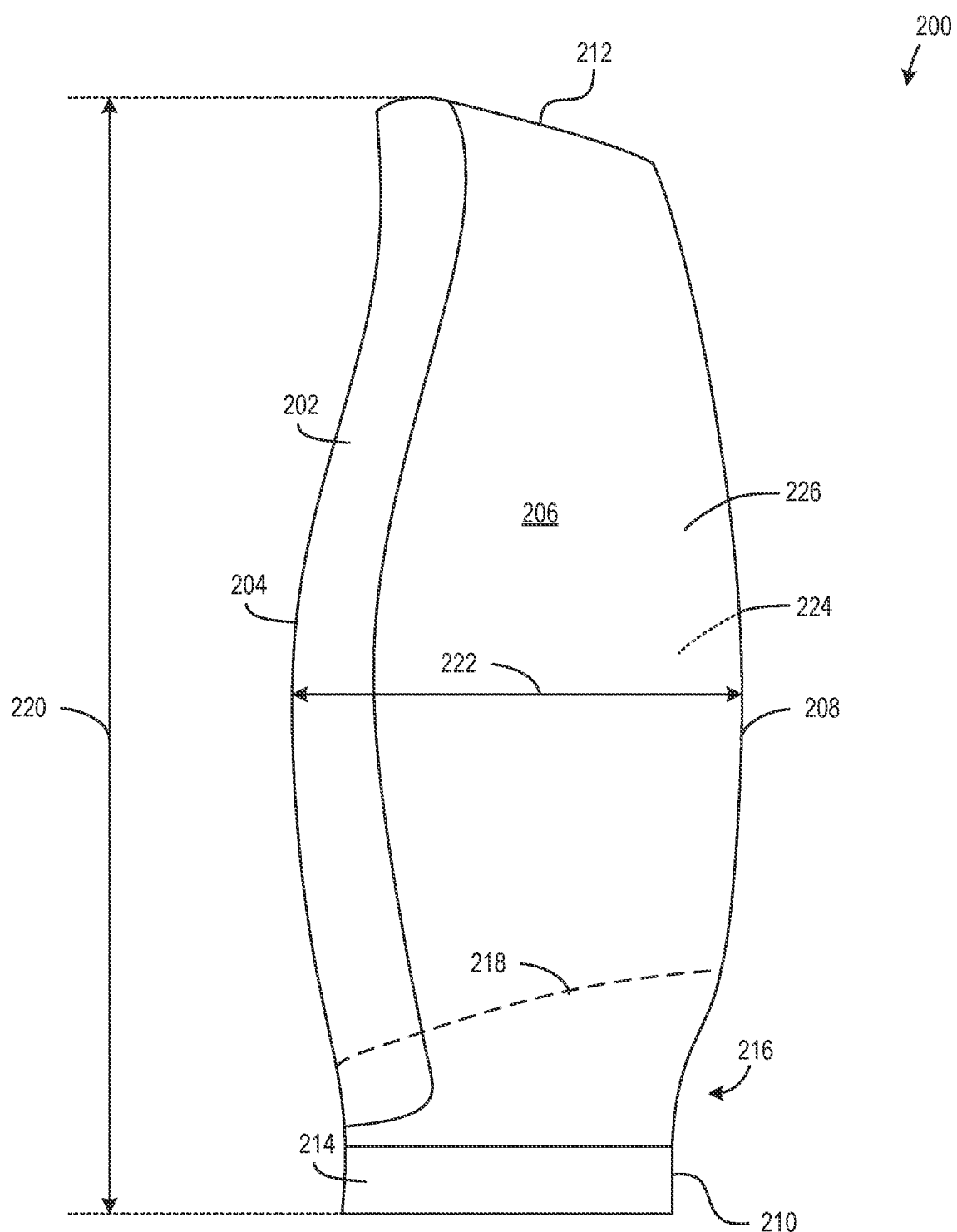
FIG. 2 is a side view of a known fan blade including a known leading edge guard.

FIG. 2 is a side view of a fan blade 200 including a known leading edge (LE) guard 202 disposed on a leading edge 204 thereof. The fan blade 200 has a main body 206 extending chordwise between the leading edge 204 and a trailing edge 208 and extending spanwise between a root 210 and a tip 212. The main body 206 of the fan blade 200 is made of composite materials, and the LE guard 202 is a single structure composed of one type of high-strength metal.

The fan blade 200 of FIG. 2 can be implemented as one of the example fan blades 140 included in the fan section 116 of the turbofan engine 110 of FIG. 1. When mounted on a rotor or fan shaft 138, a dovetail 214 of the fan blade 200 interlocks with a slot and a root section 216 is disposed within the fan shaft 138. The dovetail 214 is configured to restrict longitudinal movement due to centrifugal forces, and the root section 216 is configured to support loads from the inertia of the fan blade 200 and to restrict bending. A reference line 218 indicates an upper edge or boundary of the root section 216 and depicts where the interface between the fan blade 200 and the fan shaft 138 ends.

As mentioned previously, the fan blade 200 is configured as an airfoil that curves or twists along a span 220 extending longitudinally from the root 210 to the tip 212. As such, the leading edge 204 is contoured, and the main body 206 is cambered along a chord 222 extending laterally from the leading edge 204 to the trailing edge 208. It should be appreciated that the chord 222 illustrated in FIG. 2 is one chordwise distance and that the fan blade 200 has a variable chord that changes along the span 220. When the fan blade 200 rotates (e.g., about the centerline axis 112 of FIG. 1), air pressure increases on a pressure side 224 and decreases on a suction side 226. Thus, the air flowing chordwise accelerates across the suction side 226 and into either the LP compressor 122 or the bypass airflow passage 148.

Figure 3:
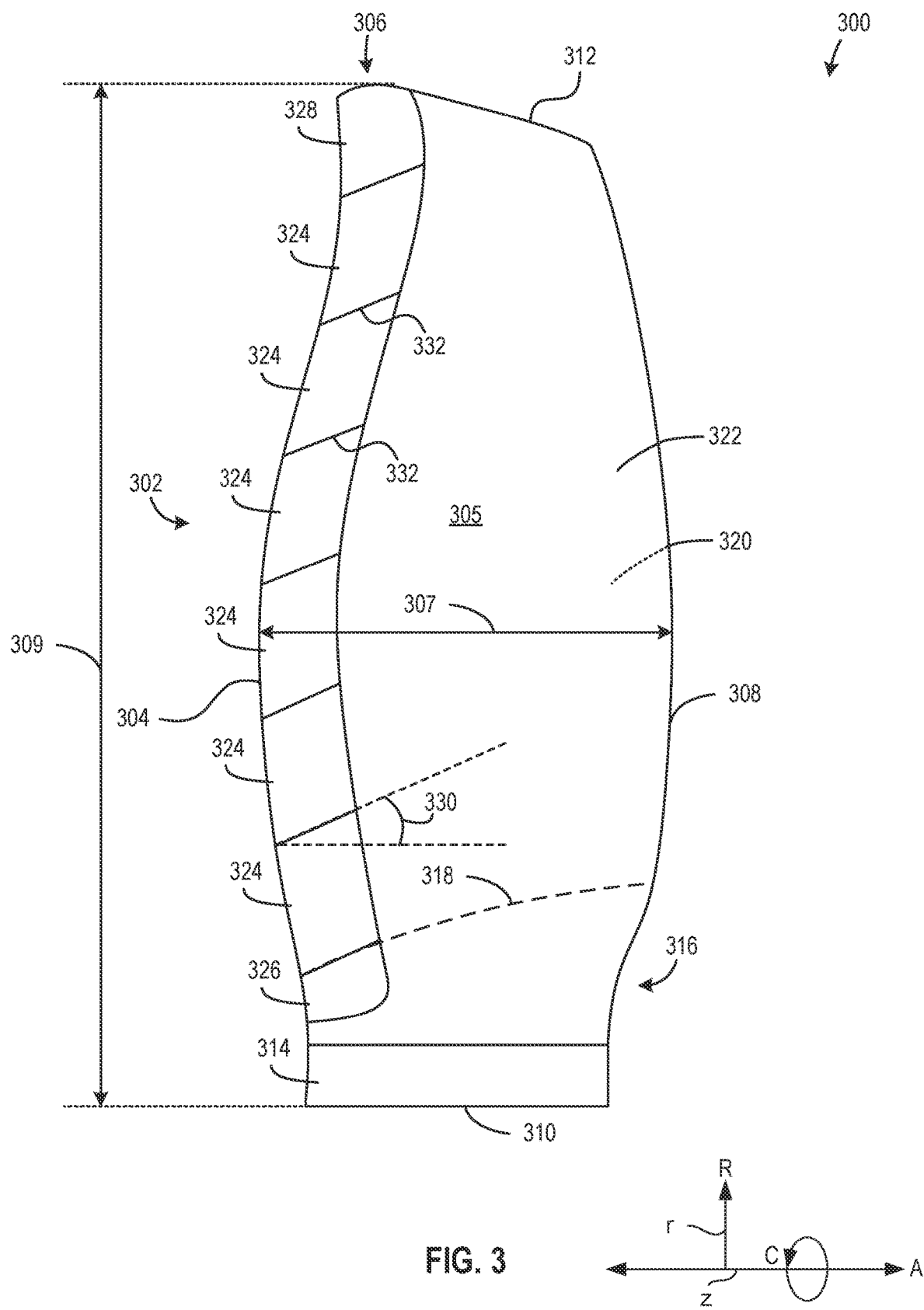
FIG. 3 is a side view of an example fan blade including an example segmented leading edge guard in accordance with teachings disclosed herein.

FIG. 3 is a side view of a fan blade 300 with an example segmented leading edge (LE) guard 302 in accordance with teachings disclosed herein. The fan blade 300 includes the segmented LE guard 302 to improve the strength of the fan blade 300 and to reduce the damage from FOD strikes. The segmented LE guard 302 covers, frames, or otherwise protects a leading edge 304 of the fan blade 300. The fan blade 300 includes a main body 305, and the segmented LE guard 302 further covers a leading section 306 of the main body 305 adjacent to the leading edge 304. The fan blade 300 extends chordwise along a chord 307 (or length) between the leading edge 304 and a trailing edge 308 and extends spanwise along a span 309 (or height) between a root 310 and a tip 312. The chord 307 of the fan blade 300 of FIG. 3 varies along the span 309. As such, the chord 307 illustrated in FIG. 3 is one of many chords and represents a corresponding length of the fan blade 300. In the illustrated example of FIG. 3, the fan blade 300 can be implemented as one of the fan blades 140 included in the fan section 116 of the turbofan engine 110 of FIG. 1.

The fan blade 300 of FIG. 3 further includes a dovetail 314, a root section 316, and a reference line 318. In some examples, the fan blade 300 and the elements thereof are similar to the fan blade 200 and the like elements of FIG. 2. In other examples, the fan blade 300 and corresponding elements are different in design, function, and/or configuration relative to the fan blade 200. For example, the main body 305 can have a longer span 309, the dovetail 314 can have a shorter chordwise width, the leading edge 304 can have a different curvature, the root section 316 can have a smaller surface area, etc.

In some examples, the main body 305 of the fan blade 200 is a hollow body made of composite materials (e.g., carbon fiber, Kevlar®, etc.). In such examples, the main body 305 can include internal structural support members, such as struts, ribs, stringers, etc. Furthermore, the main body 305 can be a hollow body made of composite materials formed around a solid material, such as foam, honeycomb panels, etc. In other examples, the main body is a solid body made of metal (e.g., aluminum, steel, etc.). Additionally or alternatively, the fan blade 300 can include another combination of composite or metal materials with either a hollow or solid construction, such as a hollow metal body.

The fan blade 300 of FIG. 3 includes a first side or a pressure side 320 and a second side or a suction side 322 opposite the pressure side 320. As described below, the segmented LE guard 302 includes a nose portion and a wing portion. The nose portion is coupled to the leading edge 304 and extends in a chordwise direction (or laterally) away from the leading edge 304. A wing portion is coupled to opposing sides (the pressure side 320 and the suction side 322) of the leading section 306 of the main body 305. The wing portion extends in the chordwise direction along the pressure and suction sides 320, 322, away from the leading edge 304, and toward the trailing edge 308. As such, the wing portion of the segmented LE guard 302 covers the leading section 306, which is positioned adjacent to the leading edge 304 and is disposed on both the pressure side 320 and the suction side 322.

In some examples, the pressure and suction sides 320, 322 converge at the leading edge 304 to define a flat surface area that is wide enough to sufficiently couple the nose portion of the segmented LE guard 302 to the fan blade 300. Similarly, the leading section 306 adjacent to the leading edge 304 is sufficiently large to provide enough surface area to sufficiently couple (e.g., bond or adhere) the wing portion of the segmented LE guard 302 to the fan blade 300. Further details of the nose and wing portions of the segmented LE guard 302 are described below in connection with FIGS. 4-10.

The segmented LE guard 302 of FIG. 3 includes a plurality of leading edge (LE) guard segments 324 (hereinafter "LE guard segments 324") consecutively arranged spanwise along the leading edge 304 of the fan blade 300. Although six of the LE guard segments 324 are shown in the illustrated example, the fan blade 300 can include two or more LE guard segments 324. The fan blade 300 includes the segmented LE guard 302 having a plurality of the LE guard segments 324 to reduce the damages incurred to the engine (e.g., the turbofan engine 110) and the components thereof, such as a nacelle, due to an FBO event. When an FOD impact causes the fan blade 300 to dislodge from a fan spool (e.g., the fan spool 138), kinetic energy causes the fan blade 300 to accelerate radially outward from the fan spool and into the containment case (e.g., the nacelle 142). Upon impact, the main body 305 of the fan blade 300 disintegrates relatively quickly because of its composite material construction, as opposed to the high-strength metal(s) of the segmented LE guard 302. The disclosed segmented LE guard 302 is configured to fragment or break apart from an impact with the surrounding engine or nacelle during an FBO event, which causes less damage than a LE guard (e.g., the LE guard 202) constructed as a single or uniform part.

Furthermore, the fan blade 300 includes the segmented LE guard 302 to improve manufacturing and repairing efficiency. Because each one of the LE guard segments 324 are fabricated to cover only a portion of the leading edge 304, the cost and complexity of conforming to the three-dimensional curvature of the fan blade 300 is significantly reduced. Furthermore, when one or more of the LE guard segments 324 deforms or decouples (e.g., unbinds), only the affected portion of the segmented LE guard 302 needs to be serviced or replaced. Non-segmented LE guards (e.g., the LE guard 202 of FIG. 2) need to be entirely removed to repair damages from FOD impacts, which is associated with long maintenance times, long periods of inactivity for the corresponding aircraft, and high costs for aviation entities.

Additionally, when one or more of the LE guard segments 324 detach from the leading edge 304, the resulting imbalance on the engine (e.g., the turbofan engine 110, etc.) is reduced. In other words, when an engine implements the LE guard 202 of FIG. 2, and when the LE guard 202 detaches, the corresponding fan blade 200 becomes much lighter than the radially opposing fan blade(s), thus causing a weight imbalance. Such imbalance leads to radial vibrations and oscillations that can further damage the engine. However, when the engine implements the segmented LE guard 302, and when one or more of the LE guard segments 324 detach, the weight of the corresponding fan blade 300 does not reduce as significantly, thus reducing the amount of imbalance in the engine and mitigating the associated damage that can occur.

In the illustrated example of FIG. 3, the segmented LE guard 302 further includes a root leading edge (LE) guard segment 326 and a tip LE guard segment 328. In some examples, the root LE guard segment 326 includes a root surface profile that is different than the root surface profiles of other LE guard segments 324. In some examples, the tip LE guard segment 328 includes a tip surface profile that is different than the tip surface profiles of other LE guard segments 324.

The segmented LE guard 302 of the illustrated example includes (e.g., is constructed of) metal(s) with a higher strength than the material (e.g., composite, metal, etc.) of the fan blade 300. In some examples, each one of the LE guard segments 324-328 of the segmented LE guard 302 includes titanium or a titanium alloy (e.g., Ti-64, etc.). In some examples, the LE guard segments 324-328 of the segmented LE guard 302 all include a martensitic precipitation-hardening (PH) stainless steel, such as 15-5 PH stainless steel. In other examples, a first subset of the LE guard segments 324-328 (e.g., root LE guard segment 326 and three adjacent ones of the LE guard segments 324) include a first metal (e.g., titanium, etc.), and a second subset of the LE guard segments 324-328 (e.g., the tip LE guard segment 328 and three adjacent ones of the LE guard segments 324) include a second metal (e.g., 15-5 PH stainless steel, 17-4 PH stainless steel, etc.). In such examples, the first metal is softer and lighter than the second metal to reduce the overall weight of the fan blade 300 while allocating material strength (and weight) to portions near the tip 312, which are more prone to bending stresses than portions near the root 310. Moreover, the second metal can be stronger that materials used in known LE guards (e.g., LE guard 202) because of the weight saved with the lighter first metal. The LE guard segments 324 of the illustrated example, can include any other combination of materials for different groupings or subsets of LE guard segments 324 based on weight saving requirements, high-probability regions for FOD strikes, etc. For example, a first subset adjacent to the root 310 and a second subset adjacent to the tip 312 can include the first metal, and a third or intermediary subset can include the second metal.

In some examples, the LE guard segments 324 are designed and fabricated to match the contour of corresponding portions of the leading edge 304 and the leading section 306 such that the segmented LE guard 302 has a continuous external surface when coupled to the fan blade 300. As such, external surfaces of adjacent ones of the LE guard segments 324-328 are flush (e.g., substantially flush) when coupled to the fan blade 300. This approximately flush arrangement of the segmented LE guard 302 prevents or attenuates aerodynamic losses (e.g., drag, turbulence, flow separation, etc.) that can develop due to air flowing over an uneven surface.

Figures 9, 10:
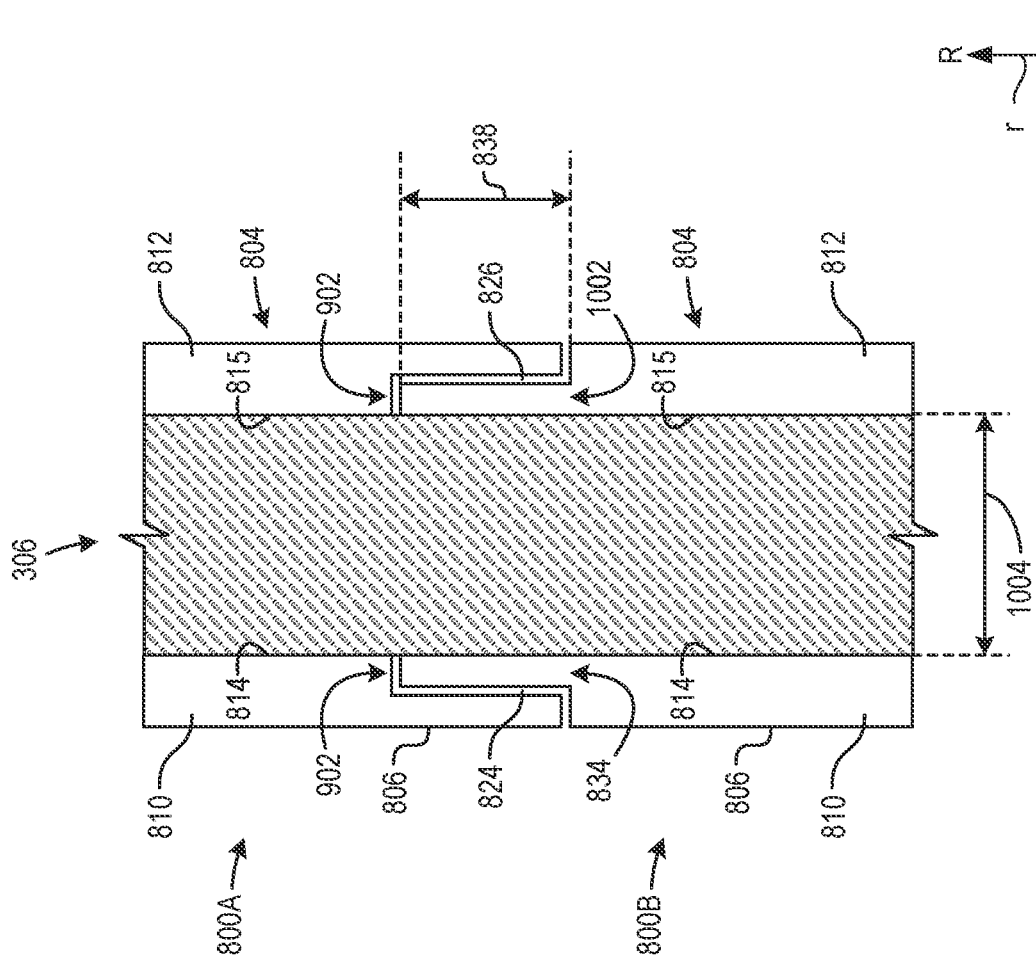
FIG. 9 is a magnified rear view of a first cross-section of the overlapping arrangement of the fifth example leading edge guard segments of FIG. 8B.
FIG. 10 is a magnified rear view of a second cross-section of the overlapping arrangement of the fifth example leading edge guard segments of FIG. 8B.

Furthermore, in some examples, the external surfaces of the LE guard segments 324-328 are flush or aligned with the pressure and suction sides 320, 322 of the fan blade 300 (described further in connection with FIGS. 9 and 10). In some examples, a coating (e.g., paint, polyurethane coating, epoxy paste adhesive, etc.) is applied to the external surface of the segmented LE guard 302 to form a smooth aerodynamic surface of the segmented LE guard 302.

As shown in the illustrated example, the LE guard segments 324-328 are oriented at a joint angle 330 relative to the chord 307 of the fan blade 300. As mentioned above, the chord 307 illustrated in FIG. 3 only represents one chord measurement of the fan blade 300 and the chord 307 varies along the span 309. As such, when the joint angle 330 is described as a measure relative to the chord 307, it is understood that the joint angle 330 is relative to a line parallel to the chord 307 as shown in FIG. 3. For example, the joint angle 330 can be measured relative to the root 310 of the fan blade 300, which is parallel to the chord 307.

The LE guard segments 324-328 have the joint angle 330 to increase the radial (spanwise) integrity and the axial (chordwise) integrity of the segmented LE guard 302 relative to non-angled segmented LE guards. The joint angle 330 can range from zero degrees to +/−60 degrees, and the greater the absolute value of the joint angle 330, the less strain the segmented LE guard 302 experiences. In the illustrated example, the joint angle 330 is oriented at a positive angle (e.g., +30 degrees) relative to the chord 307. However, in some examples, the joint angle 330 is oriented at a negative angle (e.g., −30 degrees) relative to the chord 307. Additionally or alternatively, the joint angle 330 may vary for different ones of the LE guard segments 324-328, wherein the joint angle 330 may be larger in areas most prone to FOD strikes. For example, the joint angles 330 near the root and tip can be smaller than the joint angles 330 near the midpoint of the fan blade 300.

The segmented LE guard 302 is arranged on and coupled to (e.g., adhered via epoxy, polyurethane, etc.) the fan blade 300 such that a clearance 332 is formed between adjacent ones of the LE guard segments 324-328. The clearance 332 can be included between the LE guard segments 324-328 to reduce movement (e.g., vibrations, shifting, etc.) of the LE guard segments 324-328 and interaction (e.g., contact, etc.) between adjacent ones of the LE guard segments 324-328 during an FOD impact. Furthermore, the clearances 332 dampen spanwise and chordwise strain of the segmented LE guard 302. In some examples, the clearances 332 are filled with the same coating (e.g., polyurethane, epoxy adhesives, etc.) that is applied to the external surfaces of the segmented LE guard 302. In other examples, the clearances 332 are filled with air pockets that are formed between adjacent ones of the LE guard segments 324 and the coating. In some other examples, the segmented LE guard 302 includes damping materials (e.g., foam, rubber, adhesives, etc.) disposed within the clearances 332 to provide further damping benefits.

When FOD impacts the leading edge 304, the segmented LE guard 302 experiences spanwise and chordwise strain. The strain of a part is defined as the ratio of an amount of deformation (e.g., change in length) to the original dimension (e.g., original length) of the part. The strain of the segmented LE guard 302 describes the deformation experienced due to the stress from an FOD strike. The segmented LE guard 302 can experience spanwise (normal) strain and/or chordwise (shear) strain due to an FOD strike. In some examples, the segmented LE guard 302 experiences more strain (e.g., 5%, 7%, 10% more, etc.) relative to a non-segmented LE guard (e.g., the LE guard 202 of FIG. 2). However, the clearances 332 can include coating, air, and/or damping materials to provide damping and reduce that strain. Furthermore, the joint angle 330 increases the length of the clearances 332, which increases the amount of damping material and reduces the amount of spanwise and chordwise strain. For example, when the joint angle 330 is thirty degrees, the clearances 332 are shorter and there is less damping material between adjacent ones of the LE guard segments 324 relative to when the joint angle 330 is sixty degrees. Thus, the higher the joint angle 330, the less strain the segmented LE guard 302 experiences.

FIG. 4A is a top view of a first example LE guard segment 400 in accordance with teachings disclosed herein. FIG. 4B is a side view of a non-overlapping arrangement of a plurality of the first example LE guard segments 400 of FIG. 4A. The first LE guard segment 400 can implement one of the LE guard segments 324 of FIG. 3. In the illustrated example of FIG. 4B, the plurality of the first example LE guard segments 400 includes a first LE guard segment 400A, a second LE guard segment 400B, and a third LE guard segment 400C, and the first LE guard segment 400A is positioned radially outward from the second LE guard segment 400B. Although three adjacent ones of the first LE guard segment 400 are illustrated in FIG. 4B, more (e.g., six, eight, twelve, etc.) or fewer (e.g., two) of the first LE guard segments 400 can be included in the non-overlapping arrangement of the segmented LE guard 302. In the illustrated examples of FIGS. 4A and/or 4B, the first LE guard segment 400 includes a nose portion 402, a wing portion 404, an external surface 406, a first internal surface 408, a first wing 410, a second wing 412, a second internal surface 414, a third internal surface 415, a first end 416, and a second end 418.

Furthermore, the first LE guard segment 400 extends spanwise along a first dimension or height 420 between the first end 416 and the second end 418. The second internal surface 414 and the third internal surface 415 are spaced by a second dimension 422 (or width). The external surface 406 of the first wing 410 and the external surface 406 of the second wing 412 are spaced by a third dimension 424 (or width).

The nose portion 402 extends chordwise (e.g., axially, laterally, etc.) outward and away from the leading edge 304. The first LE guard segment 400 includes the nose portion 402 to provide high-strength materials directly upstream of the fan blade 300, which improves the durability of the leading edge 304.

The external surface surrounds, covers, or otherwise wraps around the nose portion 402 and the wing portion 404. As shown in FIG. 4A, the external surface 406 of the nose portion 402 is aerodynamically curved to provide laminar air flow to the pressure side 320 and the suction side 322.

The first LE guard segment 400 includes the first internal surface 408 to sufficiently couple (e.g., bond) the nose portion 402 to the leading edge 304. As such, the first internal surface 408 of FIG. 4A can be flat and/or extend circumferentially straight along the second dimension 422 to match the shape of the leading edge 304. As shown in FIG. 4B, the first internal surface 408 can also extend radially straight along the height 420 between the first and second ends 416, 418. In some examples, the leading edge 304 is circumferentially and/or radially curved, and the first internal surface 408 includes (or matches) the same curvature in the circumferential and/or radial direction(s). Moreover, in some examples, the first LE guard segment 400 twists (e.g., radially twists) along the height 420 to correspond to the contoured form of the fan blade 300.

As shown in FIG. 4B, the first LE guard segment 400 is oriented at a zero degree angle relative to the chord 307 of FIG. 3. That is, when the first LE guard segment 400 of the illustrated example is implemented in the segmented LE guard 302 of FIG. 3, the first end 416 and the second end 418 are parallel to the chord 307. However, in some examples, the first LE guard segment 400 is oriented at an angle (e.g., the joint angle 330) relative to the chord 307. In such examples, the first internal surface 408 is orthogonal to the chord 307, and the first and second ends 416, 418 are oriented at the angle relative to the chord 307. As such, the wing portion 404 can extend laterally chordwise along the leading section 306 of the main body 305, away from the nose portion 402 (e.g., toward the trailing edge 308), and oriented at the angle (e.g., +30 degrees). In some examples, the nose portion 402 similarly extends laterally chordwise away from the wing portion 404 (e.g., away from the leading edge 304 and the main body 305) and oriented at the opposite angle (e.g., −30 degrees). In other examples, just the wing portion 404 is oriented at the angle, and the nose portion 402 is oriented parallel to the chord 307 (e.g., at a zero degree angle).

As mentioned above, the angle (e.g., the joint angle 330) of the first LE guard segment 400 improves the spanwise integrity (or stiffness) and chordwise integrity (or stiffness) of the LE guard (e.g., segmented LE guard 302). When the first LE guard segment 400 is oriented at a zero degree angle (e.g., substantially parallel) relative to the chord 307, a given FOD strike may cause a significant amount of spanwise strain (normal stain) and chordwise strain (shear strain) to the LE guard. However, when the first LE guard segment 400 is oriented at an angle (e.g., +/−60 degrees) relative to the chord 307, the amount of spanwise and chordwise strain inflicted due to the given FOD strike is reduced. For example, when the first LE guard segment 400 is oriented at a joint angle of +60 degrees, the first end 416 is positioned both radially inward and axially aft from an adjacent one of the second end 418. Thus, interactions between the first end 416 and the second end 418 allow FOD stresses (e.g., normal stresses) to transfer amongst the adjacent first LE guard segments 400, which increases the normal strain resilience (or spanwise integrity) and the shear strain resilience (or chordwise integrity) of the segmented LE guard 302.

Furthermore, the non-zero angle of the first LE guard segment 400 causes some frictional forces to develop between adjacent ones of the first LE guard segments 400. Although there is a clearance (e.g., clearance 332) between adjacent ones of the first LE guard segments 400, the first end 416 can still interface with (or contact) the second end 418. Additionally or alternatively, the first and second ends 416, 418 can interface with an intermediary damping material (e.g., foam, rubber, etc.). In either case, the angle causes some frictional forces to occur between the adjacent first LE guard segments 400 when one or more of the first LE guard segments 400 move(s), shift(s), expand(s), etc. These frictional forces improve the spanwise stiffness of the LE guard, which provides vibrational damping and reduces the amount of spanwise and/or chordwise strain due to an FOD impact.

In the illustrated example, the first end 416 has a first surface profile 426 and the second end 418 has a second surface profile 428. The first surface profile 426 and the second surface profile 428 correspond to flat surface profiles. Other example LE guard segments disclosed below include non-flat first and second surface profiles to further improve the spanwise and chordwise stiffness and integrity of the segmented LE guard 302. For the non-overlapping arrangement of the segmented LE guard 302, as shown in FIG. 4B, the second surface profile 428 joins with the first surface profile 426 of an adjacent one of the first LE guard segment 400.

FIG. 5A is a top view of a second example LE guard segment 500 in accordance with teachings disclosed herein. FIG. 5B is a side view of a non-overlapping arrangement of a plurality of the second example LE guard segments 500 of FIG. 5A. The second LE guard segment 500 can implement one of the LE guard segments 324 of FIG. 3. In the illustrated example of FIG. 5B, the plurality of the second example LE guard segments 500 includes a first LE guard segment 500A, a second LE guard segment 500B, and a third LE guard segment 500C, and the first LE guard segment 500A is positioned radially outward from the second LE guard segment 500B. Although three adjacent ones of the second LE guard segment 500 are illustrated in FIG. 5B, more (e.g., six, eight, twelve, etc.) or fewer (e.g., two) of the second LE guard segments 500 can be included in the non-overlapping arrangement of the segmented LE guard 302. In the illustrated examples of FIGS. 5A and/or 5B, the second LE guard segment 500 includes a nose portion 502, a wing portion 504, an external surface 506, a first internal surface 508, a first wing 510, a second wing 512, a second internal surface 514, a third internal surface 515, a first end 516, and a second end 518.

Furthermore, the second LE guard segment 500 extends spanwise along a first dimension or height 520 between the first end 516 and the second end 518. In some examples, a nose height 520A of the nose portion 502 and a wing height 520B of the wing portion 504 correspond to the height 420 of the first LE guard segment 400. The second internal surface 514 and the third internal surface 515 are spaced by the second dimension 422 (or width). The external surface 506 of the first wing 510 and the external surface 506 of the second wing 512 are spaced by the third dimension 424 (or width).

In some examples, the nose portion 502, the wing portion 504, the external surface 506, the first internal surface 508, the first wing 510, the second wing 512, the second internal surface 514, and the third internal surface 515 are similar to like elements of the first LE guard segment 400 of FIGS. 4A and 4B. Some geometric or dimensional differences may exist between such like elements, but the descriptions and functionalities thereof are otherwise similar. It will be appreciated that the non-flat and non-overlapping surface profiles of the first and second ends 516, 518 improve and/or alter the spanwise and chordwise integrity (or stiffness) of the segmented LE guard 302 when the second LE guard segment 500 is implemented therein.

As shown in FIGS. 5A and 5B, the second LE guard segment 500 includes a first single-stepped surface profile 526 and a second single-stepped surface profile 528. In the illustrated examples, the first end 516 includes a first step 530 defining the first single-stepped surface profile 526. Furthermore, the second end 518 includes a second step 532 defining the second single-stepped surface profile 528. In some examples, the second single-stepped surface profile 528 is the opposite (e.g., inverse, negative, converse, etc.) of the first single-stepped surface profile 526, such that the first end 516 (or the first single-stepped surface profile 526) of the second LE guard segment 500 is configured to mate or join with the second end 518 (or the second single-stepped surface profile 528) of an adjacent one of the second LE guard segment 500.

In the illustrated examples of FIGS. 5A and 5B, the first and second steps 530, 532 are positioned on the wing portion 504 of the second LE guard segment 500. In some examples, the first and second steps 530, 532 are positioned on the nose portion 502. In other examples, the first and second steps 530, 532 are aligned with the first internal surface 508 and positioned at a transition between the nose portion 502 and the wing portion 504. In the illustrated examples, the first and second steps 530, 532 are oriented orthogonal to the first and second ends 516, 518, respectively. In some examples, the first step 530 and the second step 532 are oriented at angles relative to the first end 516 and the second end 518.

FIG. 6A is a top view of a third example LE guard segment 600 in accordance with teachings disclosed herein. FIG. 6B is a side view of a non-overlapping arrangement of a plurality of the third example LE guard segments 600 of FIG. 6A. The third LE guard segment 600 can implement one of the LE guard segments 324 of FIG. 3. In the illustrated example of FIG. 6B, the plurality of the third example LE guard segments 600 includes a first LE guard segment 600A, a second LE guard segment 600B, and a third LE guard segment 600C, and the first LE guard segment 600A is positioned radially outward from the second LE guard segment 600B. Although three adjacent ones of the third LE guard segment 600 are illustrated in FIG. 6B, more (e.g., six, eight, twelve, etc.) or fewer (e.g., two) of the third LE guard segments 600 can be included in the non-overlapping arrangement of the segmented LE guard 302. In the illustrated examples of FIGS. 6A and/or 6B, the third LE guard segment 600 includes a nose portion 602, a wing portion 604, an external surface 606, a first internal surface 608, a first wing 610, a second wing 612, a second internal surface 614, a third internal surface 615, a first end 616, and a second end 618.

Furthermore, the third LE guard segment 600 extends spanwise along a first dimension or height 620 between the first end 616 and the second end 618. In some examples, a nose height 620A of the nose portion 602 and a wing height 620B of the wing portion 604 correspond to the height 420 of the first LE guard segment 400. The second internal surface 614 and the third internal surface 615 are spaced by the second dimension 422 (or width). The external surface 606 of the first wing 610 and the external surface 606 of the second wing 612 are spaced by the third dimension 424 (or width).

In some examples, the nose portion 602, the wing portion 604, the external surface 606, the first internal surface 608, the first wing 610, the second wing 612, the second internal surface 614, and the third internal surface 615 are similar to like elements of the first LE guard segment 400 of FIGS. 4A and 4B and/or the second LE guard segment 500 of FIGS. 5A and 5B. Some geometric and/or dimensional differences may exist between such like elements, but the descriptions and functionalities thereof are otherwise similar. It will be appreciated that the non-flat and non-overlapping surface profiles of the first and second ends 616, 618 improve and/or alter the spanwise and chordwise integrity (or stiffness) of the segmented LE guard 302 when the third LE guard segment 600 is implemented therein.

As shown in FIGS. 6A and 6B, the third LE guard segment 600 includes a first double-stepped surface profile 626 and a second double-stepped surface profile 628. In the illustrated examples, the first end 616 includes a first step 630 and a second step 632 defining the first double-stepped surface profile 626. Furthermore, the second end 618 includes a third step 634 and a fourth step 636 defining the second double-stepped surface profile 628. In some examples, the second double-stepped surface profile 628 is the opposite (e.g., inverse, negative, converse, etc.) of the first double-stepped surface profile 626, such that the first end 616 (or the first double-stepped surface profile 626) of the third LE guard segment 600 is configured to mate or join with the second end 618 (or the second double-stepped surface profile 628) of an adjacent one of the third LE guard segment 600.

In the illustrated examples of FIGS. 6A and 6B, the first, second, third, and fourth steps 630-636 are positioned on the wing portion 604 of the third LE guard segment 600. In some examples, the first and third steps 630, 634 are positioned on the nose portion 602. In other examples, the first and third steps 630, 634 are aligned with the first internal surface 608 and positioned at a transition between the nose portion 602 and the wing portion 604. In the illustrated examples, the first, second, third, and fourth steps 630-636 are oriented orthogonal to the first and second ends 616, 618. In some examples, the first and second steps 630, 632 and the third and fourth steps 634, 636 are oriented at angles relative to the first end 616 and the second end 618, respectively.

FIG. 7A is a top view of a fourth example LE guard segment 700 in accordance with teachings disclosed herein. FIG. 7B is a side view of a non-overlapping arrangement of a plurality of the fourth example LE guard segments 700 of FIG. 7A. The fourth LE guard segment 700 can implement one of the LE guard segments 324 of FIG. 3. In the illustrated example of FIG. 7B, the plurality of the fourth example LE guard segments 700 includes a first LE guard segment 700A, a second LE guard segment 700B, and a third LE guard segment 700C, and the first LE guard segment 700A is positioned radially outward from the second LE guard segment 700B. Although three adjacent ones of the fourth LE guard segment 700 are illustrated in FIG. 7B, more or fewer (e.g., six, eight, twelve, etc.) or fewer (e.g., two) of the fourth LE guard segments 700 can be included in the non-overlapping arrangement of the segmented LE guard 302. In the illustrated examples of FIGS. 7A and/or 7B, the fourth LE guard segment 700 includes a nose portion 702, a wing portion 704, an external surface 706, a first internal surface 708, a first wing 710, a second wing 712, a second internal surface 714, a third internal surface 715, a first end 716, and a second end 718.

Furthermore, the fourth LE guard segment 700 extends spanwise along the first dimension or height 420 between the first end 716 and the second end 718. The second internal surface 714 and the third internal surface 715 are spaced by the second dimension 422 (or width). The external surface 706 of the first wing 710 and the external surface 706 of the second wing 712 are spaced by the third dimension 424 (or width).

In some examples, the nose portion 702, the wing portion 704, the external surface 706, the first internal surface 708, the first wing 710, the second wing 712, the second internal surface 714, and the third internal surface 715 are similar to like elements of the first LE guard segment 400 of FIGS. 4A and 4B, the second LE guard segment 500 of FIGS. 5A and 5B, and/or the third LE guard segment 600 of FIGS. 6A and 6B. Some geometric and/or dimensional differences may exist between such like elements, but the descriptions and functionalities thereof are otherwise similar. It will be appreciated that the non-flat and non-overlapping surface profiles of the first and second ends 716, 718 improve and/or alter the spanwise and chordwise integrity (or stiffness) of the segmented LE guard 302 when the fourth LE guard segment 700 is implemented therein.

As shown in FIGS. 7A and 7B, the fourth LE guard segment 700 includes a ridged surface profile 726 and a grooved surface profile 728. In the illustrated examples, the first end 716 includes a first ridge 730, a second ridge 732, and a third ridge 734 defining the ridged surface profile 726. Furthermore, the second end 718 includes a first groove 736, a second groove 738, and a third groove 740 defining the grooved surface profile 728. Alternatively, the fourth LE guard segment 700 can include a greater (e.g., four, six, etc.) or fewer number (e.g., two, one, etc.) of the ridges 730-734 and the grooves 736-740. As shown in FIG. 7B, the ridges 730-734 and the grooves 736-740 have triangular profiles. However, in some examples, the ridges 730-734 and the grooves 736-740 have a differently shaped profile, such as squared or rounded. In some examples, the grooved surface profile 728 is the opposite (e.g., inverse, negative, converse, etc.) of the ridged surface profile 726, such that the first end 716 (or the ridged surface profile 726) of the fourth LE guard segment 700 is configured to mate or join with the second end 718 (or the grooved surface profile 728) of an adjacent one of the fourth LE guard segment 700.

FIG. 8A is a top view of a fifth example leading edge guard segment 800 in accordance with teachings disclosed herein. FIG. 8B is a side view of an overlapping arrangement of a plurality of the fifth example LE guard segments 800 of FIG. 8A. The fifth LE guard segment 800 can implement one of the LE guard segments 324 of FIG. 3. In the illustrated example of FIG. 8B, the plurality of the fifth example LE guard segments 800 includes a first LE guard segment 800A, a second LE guard segment 800B, and a third LE guard segment 800C, and the first LE guard segment 800A is positioned radially outward from the second LE guard segment 800B. Although three adjacent ones of the fifth LE guard segment 800 are illustrated in FIG. 8B, more or fewer of the fifth LE guard segments 800 can be included in the overlapping arrangement of the segmented LE guard 302. In the illustrated examples of FIGS. 8A and/or 8B, the fifth LE guard segment 800 includes a nose portion 802, a wing portion 804, an external surface 806, a first internal surface 808, a first wing 810, a second wing 812, a second internal surface 814, a third internal surface 815, a first end 816, and a second end 818.

Furthermore, the fifth LE guard segment 800 extends spanwise along the first dimension or height 420 between the first end 816 and the second end 818. The second internal surface 814 and the third internal surface 815 are spaced by the second dimension 422 (or width). The external surface 806 of the first wing 810 and the external surface 806 of the second wing 812 are spaced by the third dimension 424 (or width).

In some examples, the nose portion 802, the wing portion 804, the external surface 806, the first internal surface 808, the first wing 810, the second wing 812, the second internal surface 814, and the third internal surface 815 are similar to like elements of the first LE guard segment 400 of FIGS. 4A and 4B, the second LE guard segment 500 of FIGS. 5A and 5B, the third LE guard segment 600 of FIGS. 6A and 6B, and/or the fourth LE guard segment 700 of FIGS. 7A and 7B. Some geometric and/or dimensional differences may exist between such like elements, but the descriptions and functionalities thereof are otherwise similar. It will be appreciated that the overlapping arrangement of the first and second ends 816, 818 improves and/or alter the spanwise and chordwise integrity (or stiffness) of the segmented LE guard 302 when the fifth LE guard segment 800 is implemented therein.

The fifth LE guard segment 800 of FIGS. 8A and 8B includes a protrusion 822, a first tab 824, and a second tab 826. The protrusion 822 extends spanwise from the first end 816 along a second height 828. The first tab 824 and the second tab 826 extend spanwise from the first end 816 along a third height 830. As shown in FIG. 8B, the second height 828 is the same as the third height 830. However, in some examples, the second height 828 is different than (e.g., greater than) the third height 830. In the illustrated example, the protrusion 822 extends spanwise from the nose portion 802 and is configured as a cylindrical peg. The first tab 824 extends spanwise from the first wing 810, the second tab 826 extends spanwise from the second wing 812. The first and second tabs 824, 826 are configured as rectangular protrusions and/or tabs.

The fifth LE guard segment 800 includes a blind hole 832 to receive (e.g., join with, mate with, etc.) the protrusion 822. The fifth LE guard segment 800 also includes a first recess 834 to receive the first tab 824 and a second recess (described in connection with FIG. 10) to receive the second tab 826. The blind hole 832 is located in the second end 818 of the nose portion 802, the first recess 834 is located in the second end 818 of the first wing 810, and the second recess is located in the second end 818 of the second wing 812. The blind hole 832 is configured as a hole having a first depth 836. The first recess 834 has a second depth 838 and is configured as a slot being open at the second internal surfaces 814. In some examples, the first depth 836 corresponds to the second height 828 and the second depth 838 corresponds to the third height 830. As such, the first depth 836 may be the same as or different than the second depth 838.

FIG. 9 is a magnified rear view of a first cross-section A-A of the overlapping arrangement of the fifth LE guard segments 800 of FIG. 8B. FIG. 10 is a magnified rear view of a second cross-section B-B of the overlapping arrangement of the fifth example leading edge guard segments 800 of FIG. 8B. As shown in FIGS. 9 and 10, the first LE guard segment 800A is positioned adjacent to the second LE guard segment 800B. Furthermore, the first LE guard segment 800A is radially outward from the second LE guard segment 800B relative to a root of a fan blade (e.g., the root 310 of the fan blade 300).

As shown in FIG. 9, the nose portion 802 of the first LE guard segment 800A overlaps the nose portion 802 of the second LE guard segment 800B. In other words, the nose portion 802 of the first LE guard segment 800A overlaps the protrusion 822 of the second LE guard segment 800B. More specifically, in the illustrated example, the protrusion 822 of the second LE guard segment 800B fits within the blind hole 832 of the first LE guard segment 800A. In some examples, the fifth LE guard segment 800 includes additional protrusions other than the protrusion 822. For example, the fifth LE guard segment 800 can include two protrusions extending from the first end 816 of the nose portion 802 similar to the protrusion 822 that are circumferentially and/or axially spaced.

As shown in FIG. 10, the wing portion 804 of the first LE guard segment 800A overlaps the wing portion 804 of the second LE guard segment 800B. In other words, the wing portion 804 of the first LE guard segment 800A overlaps the first and second tabs 824, 826 of the second LE guard segment 800B. More specifically, in the illustrated example, the first tab 824 of the second LE guard segment 800B fits within the first recess 834 of the first LE guard segment 800A. Furthermore, the second tab 826 of the second LE guard segment 800B fits within a second recess 1002 of the first LE guard segment 800A. As such, the second recess 1002 has the same configuration and second depth 838 as the first recess 834. In some examples, the first tab 824 and the second tab 826 are shaped differently than the rectangular tab shape of the illustrated examples. That is, the first and second tabs 824, 826 can have a rounded, triangular, or trapezoidal shape based on the desired damping properties and coupling capabilities thereof.

In some examples, the fifth LE guard segment 800 is configured such that a clearance 902 is formed between adjacent ones of the fifth LE guard segment 800 (e.g., between the inner and outer fifth LE guard segments 800A, 800B). Similar to the clearance 332 of FIG. 3, the clearance 902 eliminates or reduces interaction physical interactions and dampens spanwise vibrations along the segmented LE guard 302 in the event of an FOD impact. In some examples, the clearance 902 is filled with the same coating (e.g., polyurethane) that is applied to the external surface 806 of the fifth LE guard segment 800 and the segmented LE guard 302. In other examples, the clearance 902 is filled with air pockets that are formed between the fifth LE guard segment 800 and the coating. In some other examples, the clearance 902 is filled with damping materials (e.g., foam, rubber, etc.) to provide further vibrational damping.

As shown in FIG. 10, the wing portion 804 covers the leading section 306 of the fan blade 300. In the illustrated example, the fan blade 300 is a solid composite structure. The manner in which the wing portions 804 overlap enables the segmented LE guard 302 to be joined without pinching, compressing, or otherwise reducing a width 1004 of the leading section 306 of the fan blade 300. Moreover, the fan blade 300 can be constructed such that the width 1004 does not vary along the span 309. In some examples, the width 1004 of the leading section 306 corresponds to the second dimension 422 of FIG. 8A. In some examples, the width 1004 is a first width 1004, and the main body 305 of FIG. 3 has a second width greater than the first width 1004. The third dimension 424 of the fifth LE guard segment 800 (or more generally, the segmented LE guard 302) corresponds to the second width of the main body 305.

When the segmented LE guard 302 is in the overlapping arrangement (shown in FIGS. 8A, 8B, 9, and 10), the external surface 806 of the first LE guard segment 800A is aligned with the external surface 806 of the second LE guard segment 800B. Furthermore, the second internal surface 814 of the first LE guard segment 800A is aligned with the second internal surface 814 of the second LE guard segment 800B. Similarly, the third internal surface 815 of the first LE guard segment 800A is aligned with the third internal surface 815 of the second LE guard segment 800B. The overlapping arrangement enables the width 1004 of the leading section 306 to be constant along the span 309 of FIG. 3. As such, the strength of the leading section 306 is not compromised due to material compressions at the overlapping areas. Also, the width 1004 can be uniform rather than reduced at the overlapping areas, which reduces manufacturing cost and complexity of the fan blade 300.

Example segmented leading edge (LE) guards are disclosed herein. Individual LE guard segments are more economical and more efficient to produce, install, and repair relative to LE guards composed of a single unified part. For example, in the event of a field object debris (FOD) strike, one or more of damaged (e.g., dis-bonded, etc.) LE guard segments can be replaced rather than replacing the entire LE guard. In some cases, FOD strikes are significant enough to dislodge the fan blade, which results in a fan blade out (FBO) event. In such an FBO event, disclosed segmented LE guard segments can be implemented to fragment upon impact with a surrounding engine casing, which reduces the impact damage associated with FBO events. Disclosed segmented LE guards can include a plurality of subsets of LE guard segments including different types of metals to reduce the mass of the LE guard and redistribute the strength to areas more prone to bending and/or FOD strikes. For example, a first subset of LE guard segments (proximate to the root of the fan blade) can include titanium or a titanium alloy to provide high strength while reducing weight, and a second subset of LE guard segments (proximate to the tip of the fan blade) can include stainless steel to provide increased strength relative to the first subset.

Disclosed LE guard segments can also be angled such that the connections between adjacent segments form joint angles relative to the chord of the fan blade. Such joint angles improve the spanwise and chordwise integrity of the segmented LE guard, which reduces the spanwise strain and/or the chordwise strain associated with a given FOD strike. Disclosed LE guard segments can also be arranged in an overlapping arrangement or a non-overlapping arrangement to further improve the spanwise and chordwise integrity of disclosed segmented LE guards. For example, in the non-overlapping arrangement, disclosed LE guard segments can include a first surface profile (e.g., tip surface profile, outer surface profile, etc.) and a second surface profile (e.g., root surface profile, inner surface profile, etc.). The first surface profile of a LE guard segment is configured to mate with the second surface profile of an adjacent LE guard segment without overlapping. In another example, in the overlapping arrangement, disclosed LE guard segments can include a protrusion and/or tabs extending from a first end and a hole and/or recesses in a second end. The hole of a LE guard segment is configured to receive the protrusion of an adjacent LE guard segment and the recesses of the LE guard segment are configured to receive the tabs of the adjacent LE guard segment.

Example apparatus, systems, and articles of manufacture to provide segment leading edge guards for fan blades of gas turbine engines are disclosed herein. Further examples and combinations thereof include the following:

A fan blade of a gas turbine engine, the fan blade comprising a main body having a leading edge and a trailing edge, and a leading edge guard covering the leading edge and a leading section of the main body adjacent to the leading edge, the leading edge guard including a plurality of leading edge guard segments consecutively arranged in a spanwise direction along the leading edge of the fan blade, each of the plurality of leading edge guard segments having a first end and a second end opposite the first end, the second end positioned radially inward from the first end, each of the plurality of leading edge guard segments oriented at an angle relative to a chord of the fan blade, each of the plurality of leading edge guard segments including a nose portion coupled to the leading edge and extending in a chordwise direction away from the leading edge, and a wing portion coupled to opposing sides of the leading section of the main body, the wing portion extending in the chordwise direction away from the leading edge and toward the trailing edge.

The fan blade of any preceding clause, wherein the leading edge guard includes a first leading edge guard segment and a second leading edge guard segment positioned adjacent to the first leading edge guard segment, the first leading edge guard segment positioned radially outward from the second leading edge guard segment.

The fan blade of any preceding clause, wherein the first end includes a first surface profile, and the second end includes a second surface profile, the first surface profile of the second leading edge guard segment to join with the second surface profile of the first leading edge guard segment without the first and second leading edge guard segments overlapping.

The fan blade of any preceding clause, wherein the first end of the second leading edge guard segment includes a protrusion, and the second end of the first leading edge guard segment includes a hole, the protrusion configured to fit within the hole, the first leading edge guard segment overlapping the second leading edge guard segment.

The fan blade of any preceding clause, wherein the leading edge guard includes a polyurethane coating.

The fan blade of any preceding clause, wherein the second end of the first leading edge guard segment and the first end of the second leading edge guard segment define a clearance, the clearance filled with at least one of air, the polyurethane coating, or a damping material.

The fan blade of any preceding clause, wherein a first subset of the plurality of leading edge guard segments is titanium, and a second subset of the plurality of leading edge guard segments is stainless steel, the second subset positioned radially outward from the first subset.

A leading edge guard for a fan blade in a gas turbine engine of an aircraft, the leading edge guard comprising a plurality of leading edge guard segments positioned in sequence along a leading edge of the fan blade, the plurality of leading edge guard segments oriented at an angle relative to a chord of the fan blade, each one of the plurality of leading edge guard segments extending in a spanwise direction along a height between a first end and a second end opposite the first end, the second end positioned radially inward from the first end, each one of the plurality of leading edge guard segments including a nose portion disposed on the leading edge of the fan blade, the nose portion extending in a chordwise direction along a first length away from the leading edge, and a wing portion including a first wing and a second wing disposed on opposing sides of the fan blade, the wing portion extending in the chordwise direction along a second length away from the leading edge and toward a trailing edge of the fan blade, the second length greater than the first length.

The leading edge guard of any preceding clause, wherein the plurality of leading edge guard segments are positioned in a non-overlapping arrangement.

The leading edge guard of any preceding clause, wherein the first end and the second end have flat surface profiles.

The leading edge guard of any preceding clause, wherein the first end has a first surface profile, and the second end has a second surface profile, the second surface profile configured to mate with the first surface profile.

The leading edge guard of any preceding clause, wherein the first end includes a first step defining a first single-stepped surface profile, and the second end includes a second step defining a second single-stepped surface profile.

The leading edge guard of any preceding clause, wherein the first end includes a first step and a second step defining a first double-stepped surface profile, and the second end includes a third step and a fourth step defining a second double-stepped surface profile.

The leading edge guard of any preceding clause, wherein the first end includes a first ridge, a second ridge, and a third ridge defining a ridged surface profile, and the second end includes a first groove, a second groove, and a third groove defining a grooved surface profile.

The leading edge guard of any preceding clause, wherein the plurality of leading edge guard segments are positioned in an overlapping arrangement.

The leading edge guard of any preceding clause, further including a protrusion extending spanwise from the first end of the nose portion, and a blind hole in the second end of the nose portion, the protrusion to fit within the blind hole.

The leading edge guard of any preceding clause, further including a first tab extending spanwise from the first end of the first wing, a second tab extending spanwise from the first end of the second wing, a first recess located in the second end of the first wing, the first recess to receive the first tab, and a second recess located in the second end of the second wing, the second recess to receive the second tab.

A leading edge guard segment for a fan blade of a gas turbine engine of an aircraft, the leading edge guard segment comprising an external surface, a nose portion coupled to a leading edge of the fan blade, the nose portion having a first internal surface adjacent to the leading edge of the fan blade, and a wing portion coupled to a pressure side and a suction side of the fan blade, the wing portion oriented at an angle relative to a chord of the fan blade, wherein the external surface covers the wing portion and the nose portion, the wing portion including a first wing coupled to the suction side of the fan blade, the first wing having a second internal surface adjacent to the suction side, and a second wing coupled to the pressure side of the fan blade, the second wing having a third internal surface adjacent to the pressure side, wherein the second internal surface and the third internal surface are spaced by a dimension.

The leading edge guard segment of any preceding clause, wherein the leading edge guard segment is a first leading edge guard segment positioned adjacent to a second leading edge guard segment, and the external surface of the first leading edge guard segment is aligned with the external surface of the second leading edge guard segment.

The leading edge guard segment of any preceding clause, wherein the fan blade includes a main body and a leading section, the leading section having a first width, the main body having a second width greater than the first width, the dimension defined by the second and third internal surfaces corresponding to the first width.

A gas turbine engine comprising a plurality of fan blades, a first fan blade of the plurality of fan blades including a main body having a leading edge and a trailing edge, and a leading edge guard covering the leading edge and a leading section of the main body adjacent to the leading edge, the leading edge guard including a plurality of leading edge guard segments consecutively arranged in a spanwise direction along the leading edge of the fan blade, each of the plurality of leading edge guard segments having a first end and a second end opposite the first end, the second end positioned radially inward from the first end, each of the plurality of leading edge guard segments oriented at an angle relative to a root of the fan blade, each of the plurality of leading edge guard segments including a nose portion coupled to the leading edge and extending in a chordwise direction away from the leading edge, and a wing portion coupled to opposing sides of the leading section of the main body, the wing portion extending in the chordwise direction away from the leading edge and toward the trailing edge.

The gas turbine engine of any preceding clause, wherein the leading edge guard includes a first leading edge guard segment and a second leading edge guard segment positioned adjacent to the first leading edge guard segment, the first leading edge guard segment positioned radially outward from the second leading edge guard segment.

The gas turbine engine of any preceding clause, wherein the first end includes a first surface profile, and the second end includes a second surface profile, the first surface profile of the second leading edge guard segment to join with the second surface profile of the first leading edge guard segment without the first and second leading edge guard segments overlapping.

The gas turbine engine of any preceding clause, wherein the first end of the second leading edge guard segment includes a protrusion, and the second end of the first leading edge guard segment includes a hole, the protrusion configured to fit within the hole, the first leading edge guard segment overlapping the second leading edge guard segment.

The gas turbine engine of any preceding clause, wherein the leading edge guard includes a polyurethane coating.

The gas turbine engine of any preceding clause, wherein the second end of the first leading edge guard segment and the first end of the second leading edge guard segment define a clearance, the clearance filled with at least one of air, the polyurethane coating, or a damping material.

The gas turbine engine of any preceding clause, wherein a first subset of the plurality of leading edge guard segments is titanium, and a second subset of the plurality of leading edge guard segments is stainless steel, the second subset positioned radially outward from the first subset.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A fan blade of a gas turbine engine, the fan blade comprising:
   a main body having a leading edge and a trailing edge; and a leading edge guard covering the leading edge and a leading section of the main body adjacent to the leading edge, the leading edge guard including a plurality of leading edge guard segments consecutively arranged in a spanwise direction along the leading edge of the fan blade, each of the plurality of leading edge guard segments having a first end and a second end opposite the first end, the second end positioned radially inward from the first end, each of the plurality of leading edge guard segments oriented at an angle relative to a root of the fan blade, each of the plurality of leading edge guard segments including:
- a nose portion coupled to the leading edge and extending in a chordwise direction away from the leading edge; and
- a wing portion coupled to opposing sides of the leading section of the main body, the wing portion extending in the chordwise direction away from the leading edge and toward the trailing edge;

the plurality of leading edge guard segments including:
- a first leading edge guard segment; and
- a second leading edge guard segment positioned adjacent to the first leading edge guard segment, the first leading edge guard segment positioned radially outward from the second leading edge guard segment, the second end of the first leading edge guard segment and the first end of the second leading edge guard segment define a clearance, the clearance filled with at least one of air, a polyurethane coating, or a damping material.

2. The fan blade of claim 1, wherein the first end includes a first surface profile, and the second end includes a second surface profile, the first surface profile of the second leading edge guard segment to join with the second surface profile of the first leading edge guard segment without the first and second leading edge guard segments overlapping.

3. The fan blade of claim 1, wherein the first end of the second leading edge guard segment includes a protrusion, and the second end of the first leading edge guard segment includes a hole, the protrusion configured to fit within the hole, the first leading edge guard segment overlapping the second leading edge guard segment.

4. The fan blade of claim 1, wherein the leading edge guard includes the polyurethane coating.

5. The fan blade of claim 1, wherein a first subset of the plurality of leading edge guard segments is titanium, and a second subset of the plurality of leading edge guard segments is stainless steel, the second subset positioned radially outward from the first subset.

6. The leading edge guard of claim 1, wherein the first leading edge guard segment is a first material and the second leading edge guard segment is a second material.

7. A leading edge guard for a fan blade in a gas turbine engine of an aircraft, the leading edge guard comprising:
a plurality of leading edge guard segments positioned in sequence along a leading edge of the fan blade, the plurality of leading edge guard segments oriented at an angle relative to a chord of the fan blade, each one of the plurality of leading edge guard segments extending in a spanwise direction along a height between a first end and a second end opposite the first end, the second end positioned radially inward from the first end, each one of the plurality of leading edge guard segments including:
- a nose portion disposed on the leading edge of the fan blade, the nose portion extending in a chordwise direction along a first length away from the leading edge; and
- a wing portion including a first wing and a second wing disposed on opposing sides of the fan blade, the wing portion extending in the chordwise direction along a second length away from the leading edge and toward a trailing edge of the fan blade, the second length greater than the first length; and the plurality of leading edge guard segments including:
- a first leading edge guard segment; and
- a second leading edge guard segment positioned adjacent to the first leading edge guard segment, the first leading edge guard segment positioned radially outward from the second leading edge guard segment, the second end of the first leading edge guard segment and the first end of the second leading edge guard segment define a clearance, the clearance filled with at least one of air, a polyurethane coating, or a damping material.

8. The leading edge guard of claim 7, wherein the plurality of leading edge guard segments are positioned in a non-overlapping arrangement.

9. The leading edge guard of claim 8, wherein the first end and the second end have flat surface profiles.

10. The leading edge guard of claim 8, wherein the first end has a first surface profile, and the second end has a second surface profile, the second surface profile configured to mate with the first surface profile.

11. The leading edge guard of claim 10, wherein the first end includes a first step defining a first single-stepped surface profile, and the second end includes a second step defining a second single-stepped surface profile.

12. The leading edge guard of claim 10, wherein the first end includes a first step and a second step defining a first double-stepped surface profile, and the second end includes a third step and a fourth step defining a second double-stepped surface profile.

13. The leading edge guard of claim 10, wherein the first end includes a first ridge, a second ridge, and a third ridge defining a ridged surface profile, and the second end includes a first groove, a second groove, and a third groove defining a grooved surface profile.

14. The leading edge guard of claim 7, wherein the plurality of leading edge guard segments are positioned in an overlapping arrangement.

15. The leading edge guard of claim 14, further including:
- a protrusion extending spanwise from the first end of the nose portion; and
- a blind hole in the second end of the nose portion, the protrusion to fit within the blind hole.

16. The leading edge guard of claim 14, wherein the first leading edge guard segment includes:
- a first tab extending spanwise from the first end of the first wing;
- a second tab extending spanwise from the first end of the second wing;
- a first recess located in the second end of the first wing, the first recess to receive a third tab of the second leading edge guard segment; and
- a second recess located in the second end of the second wing, the second recess to receive a fourth tab of the second leading edge guard segment.

17. A leading edge guard segment for a fan blade of a gas turbine engine of an aircraft, the leading edge guard segment comprising:

an external surface;
a nose portion coupled to a leading edge of the fan blade, the nose portion having a first internal surface adjacent to the leading edge of the fan blade; and
a wing portion coupled to a pressure side and a suction side of the fan blade, the wing portion oriented at an angle relative to a chord of the fan blade, wherein the external surface covers the wing portion and the nose portion, the wing portion including:
 a first wing coupled to the suction side of the fan blade, the first wing having a second internal surface adjacent to the suction side; and
 a second wing coupled to the pressure side of the fan blade, the second wing having a third internal surface adjacent to the pressure side, wherein the second internal surface and the third internal surface are spaced by a dimension; and
a first tab extending spanwise from a first end of the first wing;
a second tab extending spanwise from the first end of the second wing;
a first recess located in a second end of the first wing, the first recess to receive a third tab of an adjacent leading edge guard segment; and
a second recess located in the second end of the first wing, the first recess to receive a fourth tab of the adjacent leading edge guard segment.

18. The leading edge guard segment of claim 17, wherein the leading edge guard segment is a first leading edge guard segment positioned adjacent to a second leading edge guard segment, and the external surface of the first leading edge guard segment is aligned with the external surface of the second leading edge guard segment.

19. The leading edge guard segment of claim 17, wherein the fan blade includes a main body and a leading section, the leading section having a first width, the main body having a second width greater than the first width, the dimension defined by the second and third internal surfaces corresponding to the first width.

20. The leading edge guard segment of claim 17, wherein the first tab has a first spanwise height and the leading edge guard segment further including a protrusion extending from the nose portion, the protrusion having a second spanwise height substantially equal to the first spanwise height.

* * * * *